(12) United States Patent
LeBlanc

(10) Patent No.: US 9,428,243 B2
(45) Date of Patent: Aug. 30, 2016

(54) MINI STANDING HAND POWERED TRICYLE

(71) Applicant: Rodrigue LeBlanc, Joly (CA)

(72) Inventor: Rodrigue LeBlanc, Joly (CA)

(73) Assignee: Rodrigue LeBlanc, Joly Qc (CA)

( * ) Notice: Subject to any disclaimer, the term of this patent is extended or adjusted under 35 U.S.C. 154(b) by 0 days.

(21) Appl. No.: 14/756,174

(22) Filed: Aug. 13, 2015

(65) Prior Publication Data
US 2016/0075398 A1 Mar. 17, 2016

Related U.S. Application Data

(60) Provisional application No. 62/070,124, filed on Aug. 18, 2014.

(51) Int. Cl.
*B62K 21/00* (2006.01)
*B62M 1/14* (2006.01)
*B62K 5/06* (2006.01)
*B62M 9/02* (2006.01)

(52) U.S. Cl.
CPC *B62M 1/14* (2013.01); *B62K 5/06* (2013.01); *B62M 9/02* (2013.01)

(58) Field of Classification Search
CPC .................... B61M 1/14; B62M 9/02
USPC ............ 280/225, 242.1, 249, 250, 240
See application file for complete search history.

(56) References Cited

U.S. PATENT DOCUMENTS

| | | | | |
|---|---|---|---|---|
| 2,732,221 A * | 1/1956 | Welch | B62K 3/002 | 280/246 |
| 3,193,305 A * | 7/1965 | Hendricks | B62M 1/12 | 280/225 |
| 3,848,891 A * | 11/1974 | Vittori | B62M 1/14 | 280/242.1 |
| 4,798,395 A * | 1/1989 | Shaffer | A61G 5/023 | 280/240 |
| 5,282,640 A * | 2/1994 | Lindsey | B62M 1/12 | 280/233 |
| 5,899,476 A * | 5/1999 | Noyola | A61G 5/023 | 280/250.1 |
| 7,967,313 B1 * | 6/2011 | Eggert | B62K 5/02 | 280/224 |
| 8,540,265 B2 * | 9/2013 | Malone | B62K 3/002 | 280/242.1 |
| 2008/0290628 A1 * | 11/2008 | Tulpan | B62J 1/28 | 280/249 |
| 2011/0031714 A1 * | 2/2011 | Massey | B62M 1/14 | 280/221 |
| 2011/0278814 A1 * | 11/2011 | Walter | B62K 3/002 | 280/240 |
| 2014/0239610 A1 * | 8/2014 | Lasher, III | B62K 25/04 | 280/276 |
| 2015/0069733 A1 * | 3/2015 | Ju | A61G 5/027 | 280/249 |

\* cited by examiner

*Primary Examiner* — Tony Winner

(57) ABSTRACT

A mini standing hand powered tricycle for sidewalks, indoor large surfaces, etc. conceived for users, with weak legs and strong arms that get tired walking. The tricycle is propulse by a conventional bicycle hand pedal sprocket wheel and chain to allow driving, steering, and braking by the user in a standing position.

3 Claims, 7 Drawing Sheets

MINI STANDING HAND POWERED TRICYLE

CROSS-REFERENCE TO RELATED APPLICATION

A prior provisional application was submitted with filing date Aug. 18, 2014 and application No. 62/070,124 for a mini standing hand powered tricycle.

BACKGROUND OF THE INVENTION

The field of endeavor of my invention pertains to bicycle technology particularly to the standing hand tricycle.

BRIEF SUMMARY OF THE INVENTION

The substance or general idea of my invention is to allow people with weak legs and strong arms that get tired walking to use, in a standing position, a light and simple hand powered tricycle instead to have to use prematurely a wheelchair or an electric wheeled vehicle heavy and expensive. This new configuration of a hand tricycle allowing user to stand constitutes a technological improvement in the cycle industry.

DETAILED DESCRIPTION OF THE INVENTION

My invention consist in a mini standing hand powered tricycle FIG. 1 for sidewalks, shopping centers, indoor large surfaces, etc. Conceived originally for users, with weak legs and strong arms, that get tired walking.

A 12½ inch bicycle wheel with standered sprocket and brake is used. FIG. 2 The wheel is propulse by a conventional bicycle pedal sprocket wheel assembly FIG. 3 to allow hand propulsion, steering, and braking by the user in a standing position.

The frame is made from standered bicycle framing FIG. 4.

A reinforce post approximately 36" long FIG. 4 in a upright position is used with the pedal sprocket wheel assembly FIG. 3 at the upper end and the 12½ inch wheel with its sprocket brake assembly FIG. 2 at the bottom end.

A standered bicycle chain is used as a power transmitter.

A light aluminium 10"×12" platform (a sort of mini flat trailer) mounted on two 3" skate board wheels FIG. 5 on which the user stands is couple to the reinforce post previously described. FIG. 4

A bicycle front wheel fork tubing bearing assembly FIG. 6 is used to connect the skateboard wheel platform to the main post. The female tubing is welded vertically to the main post FIG. 4 and the male bearing tubing is firmly attached to the plate form. FIG. 5. When insert one into the other, the retaining washer and nut in place, the standing tricycle is operational. Side view of the tricycle FIG. 7

Figure 1:
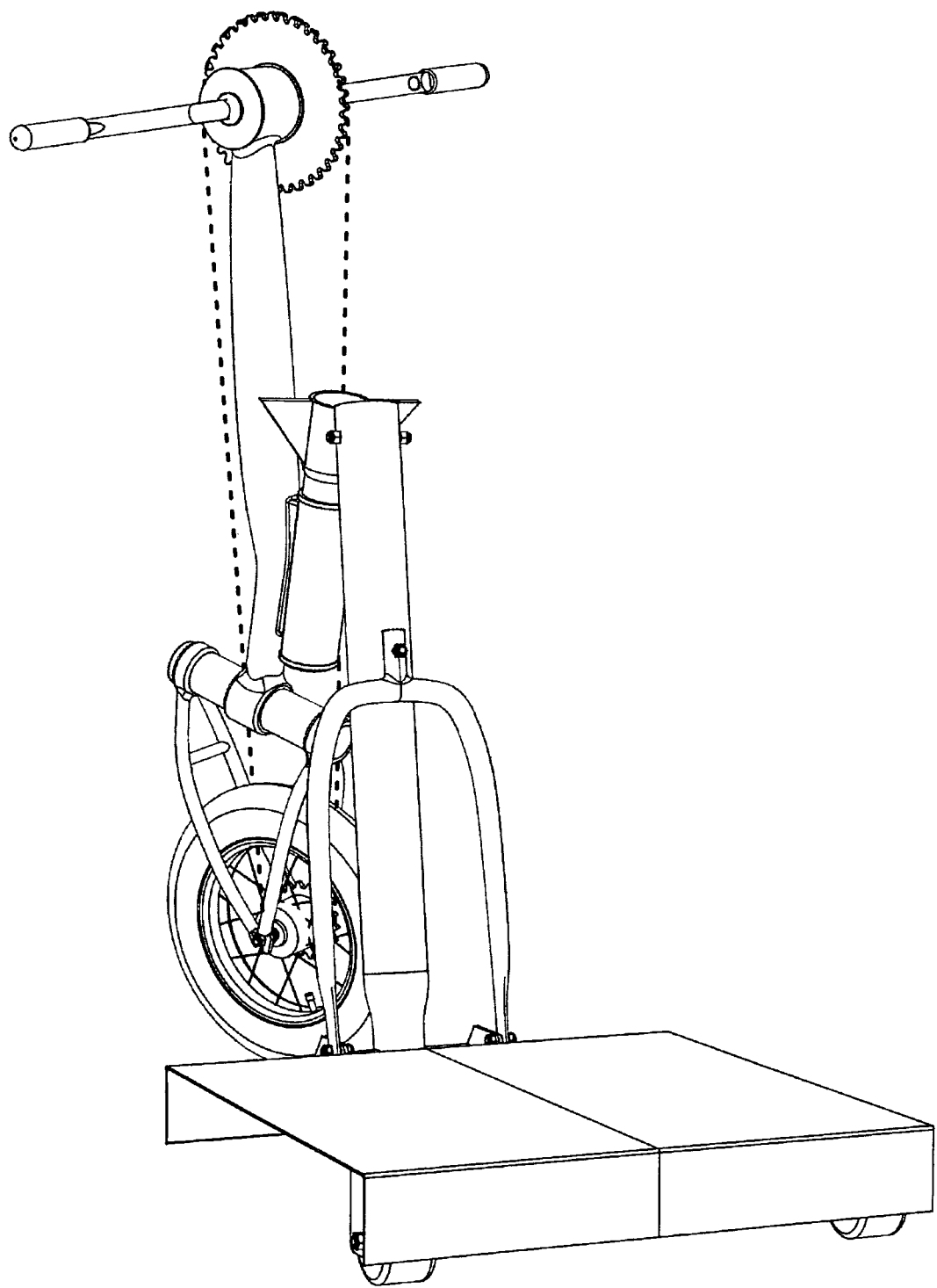
FIG. 1 Side view of the tricycle
Figure 2:
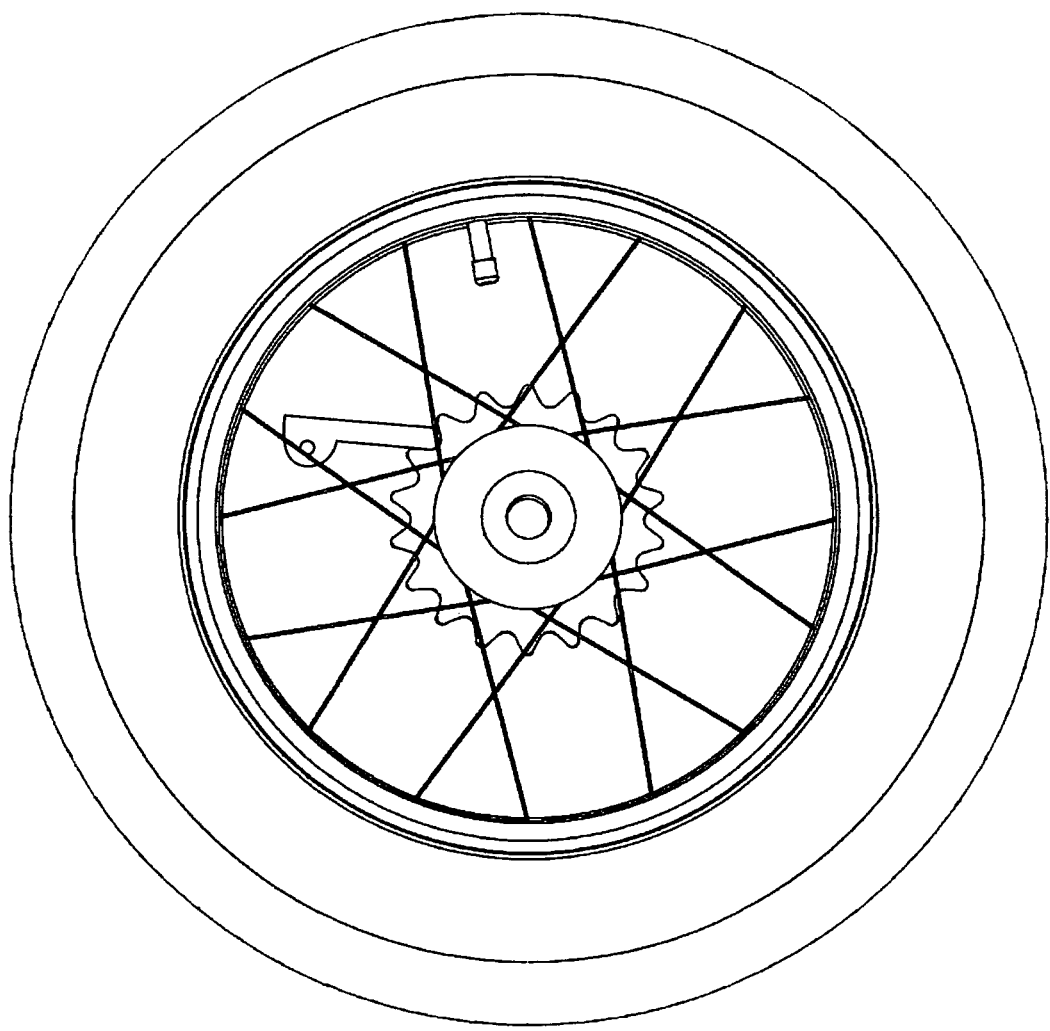
FIG. 2 a 12½ inch bicycle wheel with standered sprocket and brake
Figure 3:
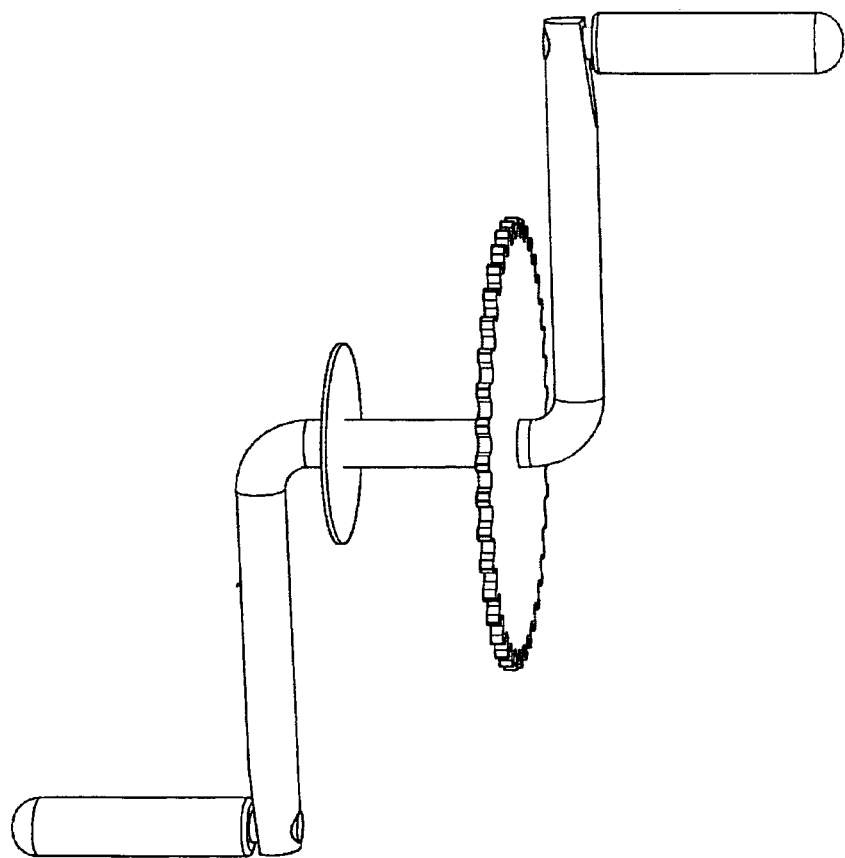
FIG. 3 Conventional bicycle pedal sprocket wheel assembly
Figure 4:
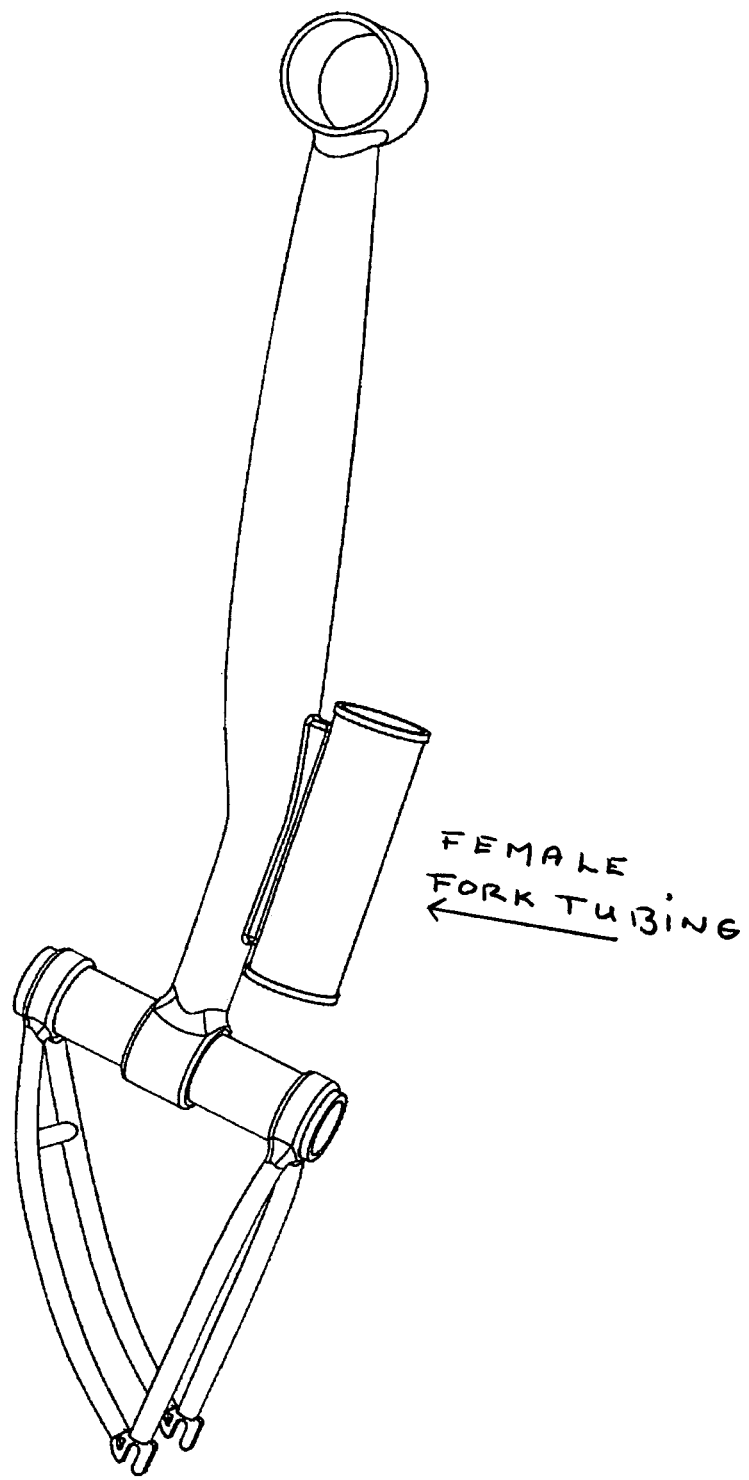
FIG. 4 Reinforce post approximately 36" long with the pedal sprocket cylinder welded at the upper end, a female fork tubing welded along it and the rear bicycle wheel frame braces welded at the bottom end.
Figure 5:
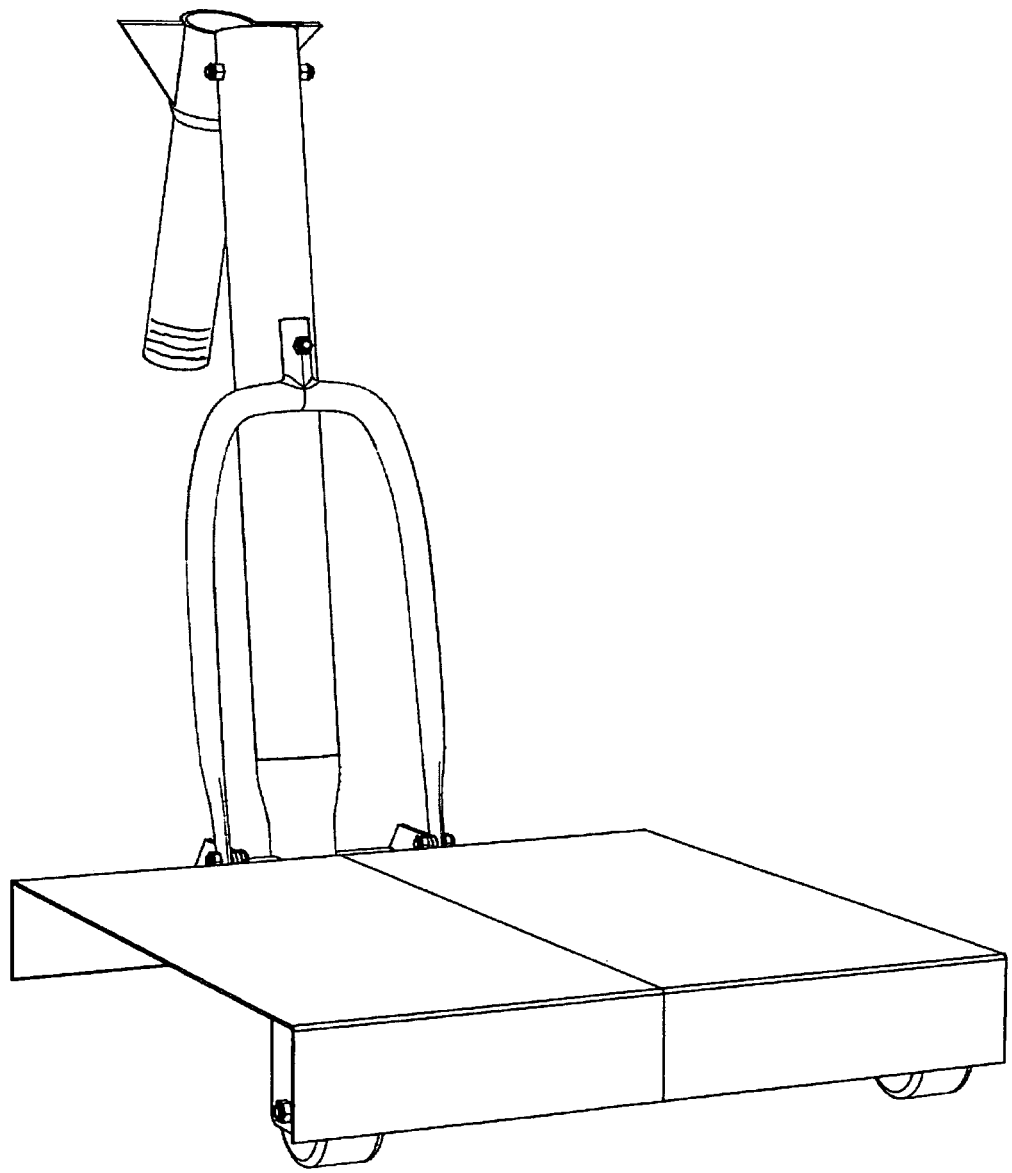
FIG. 5 Aluminium 10"×12" platform mounted on two 3" skate board wheels
Figure 6:
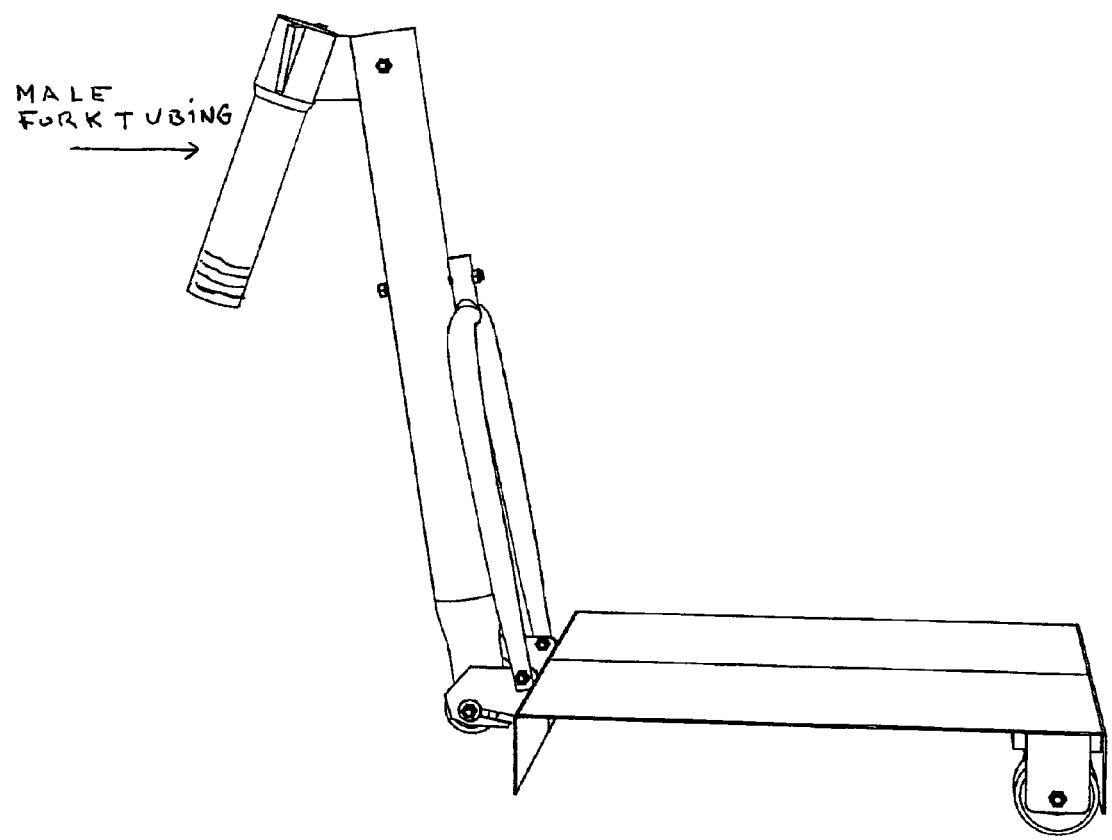
FIG. 6 Male tubing of a bicycle front wheel fork tubing bearing assembly
Figure 7:
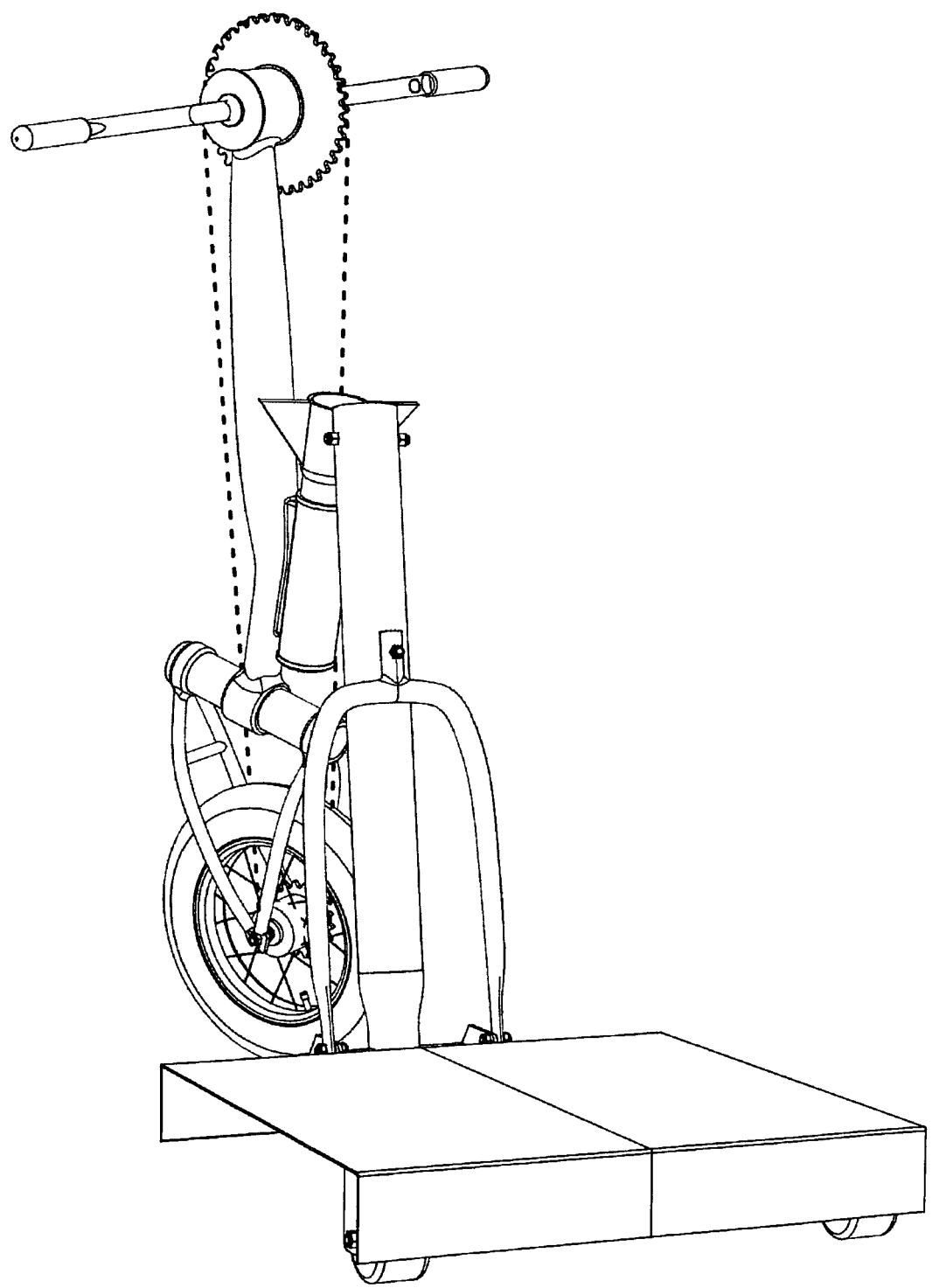
FIG. 7 Side view of the tricycle

The invention claimed is:

1. A standing hand powered tricycle comprising:
 a front frame and a rear frame;
 said front frame including:
  a vertical post having a top end and a bottom end;
  a pedal sprocket cylinder having an input sprocket, said cylinder is welded to said top end;
  a front wheel support assembly operably coupled to said bottom end of said post; and
 a sleeve connected to said vertical post at a location closer to said bottom end;
  said rear frame including:
  a vertical post having a top end and a bottom end;
  a shaft having a first end and a second end, wherein said first end welded to said top end of said post:
  a standing platform having a front end, a rear end, and two wheels;
  said front end detachably attached to said vertical post at said bottom end; and
  said shaft rotatably attached to said sleeve to allow articulation of said front frame relative to said rear frame.

2. The tricycle according to claim 1, wherein the standing platform is made of light aluminum.

3. The tricycle according to claim 1, wherein said front wheel further including an output sprocket, said output sprocket is connected to said input sprocket via a chain.

* * * * *